(12) United States Patent
Yang et al.

(10) Patent No.: US 11,044,238 B2
(45) Date of Patent: Jun. 22, 2021

(54) SECURE COMMUNICATIONS AMONG TENANT VIRTUAL MACHINES IN A CLOUD NETWORKING ENVIRONMENT

(71) Applicant: International Business Machines Corporation, Armonk, NY (US)

(72) Inventors: Yi Yang, Cary, NC (US); Timothy J. Kuik, White Bear Lake, MN (US); Kyle Andrew Donald Mestery, Woodbury, MN (US); Hank R. Gibson, Boise, ID (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 318 days.

(21) Appl. No.: 16/165,677

(22) Filed: Oct. 19, 2018

(65) Prior Publication Data
US 2020/0127981 A1 Apr. 23, 2020

(51) Int. Cl.
| | |
|---|---|
| H04L 29/06 | (2006.01) |
| H04L 9/08 | (2006.01) |
| H04L 9/32 | (2006.01) |
| G06F 21/60 | (2013.01) |
| H04L 9/16 | (2006.01) |
| H04L 29/08 | (2006.01) |

(52) U.S. Cl.
CPC ........ *H04L 63/0435* (2013.01); *H04L 9/0819* (2013.01); *H04L 9/0861* (2013.01); *H04L 9/0891* (2013.01); *H04L 9/16* (2013.01); *H04L 63/062* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,719,590 B1 | 5/2014 | Faibish et al. | |
| 9,998,339 B1* | 6/2018 | Brajkovic | H04L 41/0853 |
| 2007/0209071 A1 | 9/2007 | Weis | |
| 2014/0380057 A1* | 12/2014 | Shi | H04L 9/0877 |
| | | | 713/171 |
| 2015/0134965 A1 | 5/2015 | Morenius et al. | |
| 2015/0379277 A1* | 12/2015 | Thota | G06F 9/542 |
| | | | 713/189 |
| 2016/0119150 A1* | 4/2016 | Robison | H04L 67/10 |
| | | | 713/158 |

(Continued)

*Primary Examiner* — Joseph P Hirl
*Assistant Examiner* — Hassan Saadoun
(74) *Attorney, Agent, or Firm* — Garg Law Firm, PLLC; Rakesh Garg; Michael O'Keefe

(57) ABSTRACT

A first encryption key associated with a first tenant is created. The first encryption key is configured in a host where a virtual machine associated with the first tenant is executing, the host including a network interface controller configured to have a virtual network interface function, the virtual network interface function executing on the host and being associated with the virtual machine of the first tenant. The virtual network interface function is caused to bind the first encryption key to the virtual machine of the first tenant. The virtual network interface function is caused to encrypt outgoing network traffic of the first tenant using the first encryption key. The virtual network interface function is caused to decrypt incoming network traffic for the first tenant using the first encryption key.

17 Claims, 9 Drawing Sheets

(56) References Cited

U.S. PATENT DOCUMENTS

| | | |
|---|---|---|
| 2016/0359622 A1 | 12/2016 | Bunch et al. |
| 2017/0034129 A1* | 2/2017 | Sawant ................. H04L 63/061 |
| 2018/0063103 A1 | 3/2018 | Jahid et al. |
| 2018/0091551 A1 | 3/2018 | Palanigounder et al. |
| 2018/0262468 A1* | 9/2018 | Kumar .................... H04L 67/10 |
| 2019/0007378 A1* | 1/2019 | Jowett .................. H04L 9/3268 |

* cited by examiner

SECURE COMMUNICATIONS AMONG TENANT VIRTUAL MACHINES IN A CLOUD NETWORKING ENVIRONMENT

TECHNICAL FIELD

The present invention relates generally to a method, system, and computer program product for secure communications in a cloud networking environment. More particularly, the present invention relates to a method, system, and computer program product for secure communications among tenant virtual machines in a cloud networking environment.

BACKGROUND

A virtual machine (VM) comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host.

For example, the host may include a processor component. One virtual representation of the processor can be assigned to one VM, and another virtual representation of the same processor can be assigned to another VM, both VMs executing on the host. Furthermore, the second VM may also have access to a virtual representation of a reserve processor in the host and certain other resources, either exclusively or in a shared manner with the first VM.

Certain data processing systems are configured to process several workloads simultaneously. For example, separate virtual data processing systems, such as separate VMs, configured on a single host data processing system often process separate workloads for different clients or applications.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

VMs are installed or created on a compute node as needed for processing workloads, meeting service level requirements, and many other reasons. Furthermore, different configurations of VMs may be needed for different purposes. For example, when a VM is created just for providing a user a general purpose computing platform, the VM may be created only with the basic operating system and no applications. In another example, when a new VM has to provide application services, the VM may be created with an operating system and an application server configured thereon. Similarly, many different configurations of VMs may be created for a variety of other purposes.

Thus multiple virtual machines can share the same physical resources, and software running on the virtual machine does not need to be aware of changes in the underlying physical hardware, such as when cloud computing resources in a datacenter are provisioned, removed, or reallocated. A tenant virtual machine, as used herein, refers to a virtual machine running in a virtualized environment under the administrative control of a tenant, account holder or subscriber. VMs belonging to same tenant may be located on the same or different hosts, and one tenant can host VMs belonging to the same or different tenants.

Cloud computing environments rely on network nodes, which are redistribution points that route traffic to and from virtual machines running on hosts operating on the network. Network nodes are logically separate from VMs. When traffic among network nodes is sent unencrypted, a network node that misroutes traffic gives rise to security concerns. As a result, system administrators often want to encrypt traffic between virtual machines.

SUMMARY

The illustrative embodiments provide a method, system, and computer program product. An embodiment includes a method that creates a first encryption key associated with a first tenant. An embodiment configures the first encryption key in a host where a virtual machine associated with the first tenant is executing, the host including a network interface controller configured to have a virtual network interface function, the virtual network interface function executing on the host and being associated with the virtual machine of the first tenant. An embodiment causes the virtual network interface function to bind the first encryption key to the virtual machine of the first tenant. An embodiment causes the virtual network interface function to encrypt outgoing network traffic of the first tenant using the first encryption key. An embodiment causes the virtual network interface function to decrypt incoming network traffic for the first tenant using the first encryption key.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
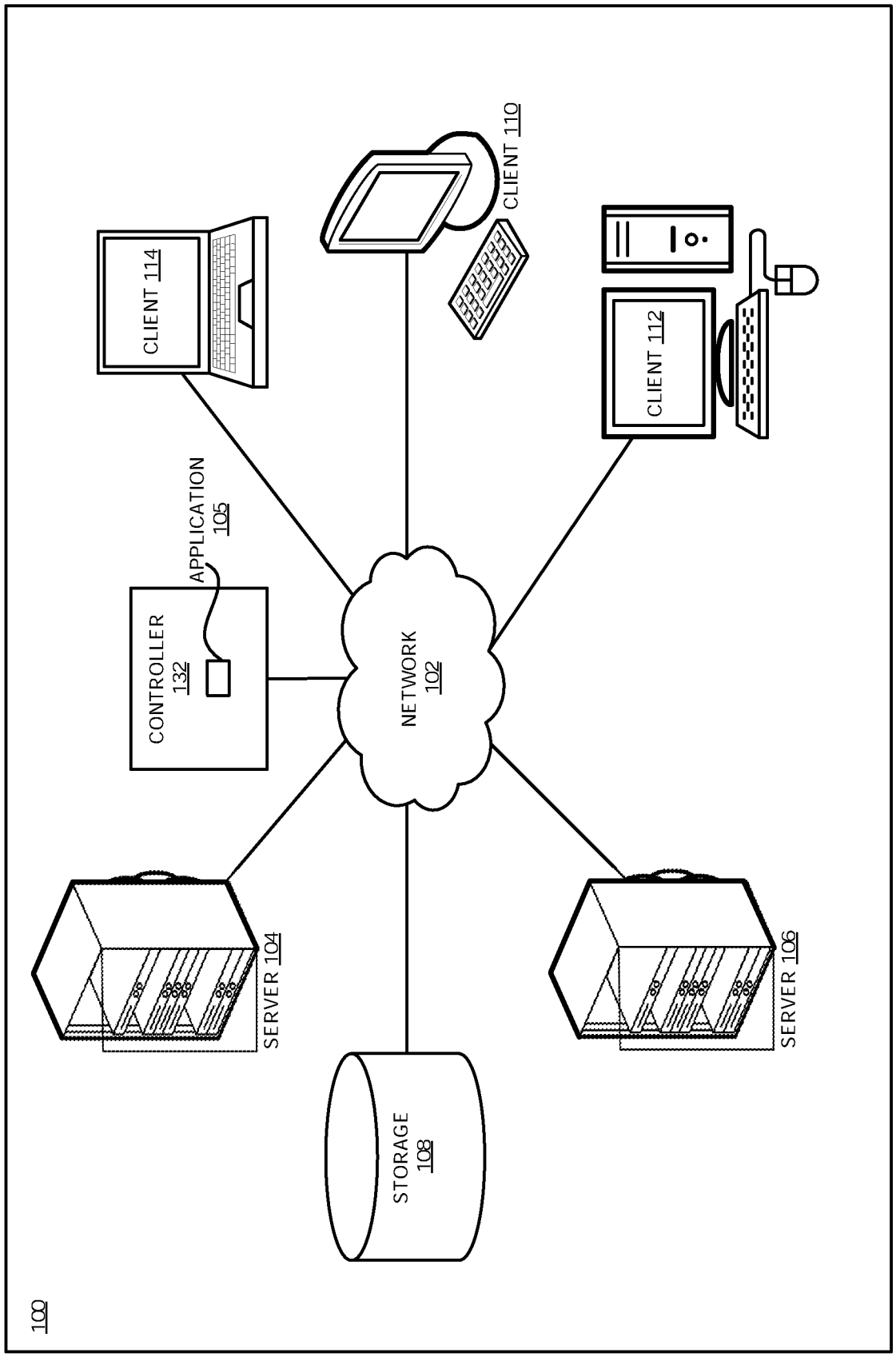
FIG. 1 depicts a block diagram of a network of data processing systems in which illustrative embodiments may be implemented.

Users are often interested in improving data security by encrypting traffic between virtual machines of the same user, or tenant. Internet Protocol security (IPSec) is a secure network protocol suite that authenticates and encrypts packets of data sent over a network such as the Internet. IPsec includes protocols for establishing mutual authentication at the beginning of a session of data transmission—so that both parties are certain of the other's identity—and negotiation of cryptographic keys to use during the session. Parties exchanging data can authenticate each other using a pre-shared key already in the possession of both parties. Each party sends the other hashes of the shared key to prove that they are in possession of the same key. Parties exchanging data can also authenticate each other using public key encryption, where each party has a public and a private key. The parties exchange their public keys and each party sends the other a nonce encrypted with the other's public key. Alternatively, parties can authenticate each other if both hold a public key certificate from a certificate authority. Once authenticated, the two hosts agree on which algorithm is used to encrypt the IP packet, and which hash function is used to ensure the integrity of the data. As well, protocols—such as the Internet Key Exchange (IKE) protocol—provide for non-disruptively refreshing session encryption keys based on the security policy of a particular installation. IKE specifies that key refresh can be based on time and bytes transmitted since a previous key refresh.

However, traditional IPSec is point-to-point, connecting one VM to another VM. Thus, connecting three VMs together requires three connection paths (also known as tunnels), connecting four VMs together requires six connection paths, and so on.

In addition, each tunnel requires one encryption key for each direction of traffic. In particular, one VM encrypts traffic using one key and sends the traffic to a second VM, which decrypts the traffic using the same key. If the second VM needs to send encrypted traffic back to the first VM, the second VM encrypts the traffic using a second encryption key and sends the encrypted traffic to the first VM, which uses the second key to decrypt the incoming traffic from the second VM.

Thus, as cloud computing infrastructures of hundreds or thousands, or even millions of VMs become more common, both the number of tunnels and the encryption keys required for communication through the tunnels grow exponentially. In addition, performing the necessary traffic encryption and decryption on each VM is computationally demanding, limiting VM performance or requiring additional computing resources. As a result, the illustrative embodiments recognize that traditional full mesh point-to-point IPSec is not an effective solution for encrypted networking traffic in a cloud environment at larger scales.

Multiprotocol Label Switching (MPLS) is a type of data-carrying technique for high-performance telecommunications networks. MPLS directs data from one network node to the next based on short path labels that identify virtual links or paths between network nodes. Group Encrypted Transport Virtual Private Network (GET VPN) and Group Virtual Private Network (Group VPN) are both security schemes that secure site-to-site communications operating on MPLS Virtual Private Networks (VPNs), using a trusted group. All members of a group share a common security association, enabling all group members to share a common key and decrypt traffic that was encrypted by any other group member. In each GETVPN or Group VPN implementation, a centralized key server manages encryption keys. At each site, a customer edge (CE) router acts as a group member, maintaining a secured session with the key server to receive new encryption keys. Traffic between any of the CEs in a VPN is encrypted using the same key, simplifying key management significantly. In addition, CEs perform the necessary encryption and decryption, improving host performance.

However, GETVPN and Group VPN implementations were designed for MPLS networks, and are unsuited for a cloud computing environment. In particular, cloud-based VM-to-VM communications require a much larger scale than can be supported in MPLS. As well, in an MPLS network each CE is owned by a particular network user, and is within that user's security boundary—thus configuring a CE as a group member to store keys does not present a security concern. In contrast, in cloud environments hosts are shared among multiple users, so the security boundary is vague and special measurements must be taken to isolate one user's keys and IPSec profiles from those of another user. As well, group members in MPLS networks require more overhead to deploy and configure than is acceptable for frequently-changing cloud environments.

Further, because GETVPN and Group VPN implementations secure site-to-site communications, traffic can be encrypted at one end of a site-to-site path and decrypted at the other end while keeping the encryption and decryption transparent to the end hosts at either ends of the path. Inserting encryption service for VM-to-VM communication in cloud environments, while keeping the encryption and decryption transparent to the VMs, is more challenging to implement. As well, GETVPN and Group VPN implementations were designed for MPLS' site-to-side communication, without many equal-cost paths over which to route traffic. As a result, when using same key, IPSec packets between two nodes do not provide accessible packet flow information that can be used to support Equal Cost Multiple Paths (ECMP) traffic routing required in cloud environments. Thus, the illustrative embodiments recognize that GETVPN and Group VPN implementations are not an effective solution to secure communication in a cloud environment either.

The illustrative embodiments recognize that the presently available tools or solutions do not address these needs or provide adequate solutions for these needs. The illustrative embodiments used to describe the invention generally address and solve the above-described problems and other problems related to secure communications among tenant virtual machines in a cloud networking environment.

An embodiment can be implemented as a software application. The application implementing an embodiment can be configured as a modification of a controller within an existing cloud networking system, as a separate application that operates in conjunction with a controller within an existing cloud networking system, a standalone application, or some combination thereof.

Particularly, some illustrative embodiments provide a method by which encryption keys are distributed to hosts and managed on a per-tenant basis that supports ECMP, using existing host implementations in a cloud computing environment.

An embodiment is implemented within a controller. As used herein, a controller does not transport data traffic, but instead instructs other units to transport traffic. A controller can be implemented as an appliance, a cluster of nodes, a VM, a host, a container, or a multiple of these elements.

An embodiment makes use of additional functionality of hosts. Virtual machines, as discussed herein, run on hosts. Hosts also include smartNIC functionality. A smartNIC is a network interface card (NIC) that offloads processing tasks that the system processor would normally handle. Using its own on-board processor, a smartNIC typically performs functions such as encryption/decryption, firewall, and TCP/IP and HTTP processing. Just as a physical computer can be virtualized to multiple virtual machines, each mimicking a physical computer, a smartNIC can also be virtualized. For example, Single Root I/O Virtualization (SR-IOV) is a specification that allows one installed physical device to appear to be multiple separate devices. For example, a quad-port SR-IOV NIC presents itself as four devices, each with a single port. Each of these devices could have up to 256 virtual functions (VFs), each presenting as a single port NIC, for a theoretical total of 1,024 VFs. As a result, an appropriately-configured host can associate each virtual machine with a virtual NIC. When a tenant requires the resources of a virtual machine, a VM for that tenant is created and launched on a host and associated with a NIC VF also running on the host.

An embodiment includes a key management component corresponding to each tenant of a cloud computing environment. When a new tenant VM is created, the embodiment sends the current key for that tenant, including a key ID and a key value, to the SmartNIC on the host, binds the current key to a VF, and enables IPSec on the VF. Thus, a VM sends packets normally. The VF receives each packet from the VM, encrypts the packet using the current tenant-specific key, then sends the packet over the network. At the packet's destination, a second VF running on a different host receives the encrypted packet, decrypts it, also using the current tenant specific key, and passes the packet along to an associated VM also running on the host. As a result, traffic between a tenant's VMs is encrypted during transit, using symmetric encryption using a common key, i.e., the tenant-specific key.

An embodiment need only use one key to encrypt all traffic among VMs of one tenant. In contrast, traditional IPSec in the cloud environment requires one key for each direction of traffic of each VM pair. Thus an embodiment requires significantly fewer keys, and manages the required keys centrally. In addition, performing encryption and decryption on the VFs offloads this function from the VMs, improving VM performance.

An embodiment causes the configuration of traffic packets to provide accessible, unencrypted, packet flow information that can be used to support ECMP functionality for network traffic management. In particular key ID and flow ID information are placed within an authenticated, but unencrypted section of each packet. Key ID refers to the identification number of the key used to encrypt the packet. For example, if a tenant is currently using key number 25 to encrypt the tenant's packets, the key ID included in each of that tenant's packets would be 25. Flow ID refers to information generated by the sending VF, based on flow information such as the source IP address, destination IP address, protocol number, source port, and destination port for a particular packet. Using the flow information, ECMP can be used to route packets appropriately while performing load balancing among multiple routes that may be available between hosts.

An embodiment manages key expiration and replacement. Keys are typically replaced every few hours, to maintain security. When an existing key is about to expire, an embodiment sends out a new key to all hosts having tenants using that key, to be applied to corresponding VFs. An embodiment can be configured to specify a wait-time window for the new key, to allow enough time for all the VFs to synchronize. As a result, all VFs associated with a tenant update to the new key in a synchronized manner.

An embodiment can also revoke keys when necessary. An embodiment monitors and analyzes network activity. If a particular VM appears to be exhibiting suspicious behavior—for example, due to a virus or other software or networking problem—an embodiment can quarantine that particular VM. A quarantine can be accomplished by revoking the key that particular VM is using, or by updating the keys all the other VMs are using. Using either method, even if the quarantined VM sends encrypted traffic, the other VMs will not decrypt the traffic and be affected by the problem. As well, the quarantined VM is unaware that traffic it sends is not being decrypted, allowing system administrators to preserve the state of the quarantined VM for later analysis.

VMs are often modified in cloud computing environments. As workloads change, VMs may be added, deleted, or moved from one tenant to another. When a VM is modified, an embodiment updates and binds the associated SmartNIC/VF key correspondingly, without touching other VMs. An embodiment can also recover a key, for example when a VM is rebooted. Thus, an embodiment supports rapid VM configuration.

As well, an embodiment is configurable to distribute different keys within the VMs of a tenant, based on a policy. For example, a tenant may use VMs associated with different departments within a company. Maintaining different keys for different departments compartmentalizes information, potentially improving security. As another example, a tenant may use VMs located in different geographical areas to process data associated with those areas. Such data may also be subject to geographical restrictions. For example, system administrators may want to ensure that data associated with one country's or one geographical area's citizens is not exported, or is exported only under certain circumstances or with certain restrictions. Maintaining different keys for different geographical areas is an easily-administered solution to enforcing such geographic restrictions. Other policy-based key distribution schemes are also possible, and contemplated within the scope of the illustrative embodiments.

An embodiment is also configurable to secure traffic between a group of tenants. For example, banks A, B and C may have common interests in trading together. To implement such a configuration, an embodiment distributes a common key among groups of selected VMs associated with banks A, B and C. Other VMs associated with banks A, B and C use other, separate keys, isolating the common pool from other data of the three tenants that is not being shared.

The illustrative embodiments are described herein using examples related to communications between one VM and another. Additional illustrative embodiments secure traffic between VMs and dedicated bare metal servers, between VMs and storage components, and between VMs and other network components, in a like manner.

The manner of secure communications among tenant virtual machines in a cloud networking environment described herein is unavailable in the presently available methods. A method of an embodiment described herein, when implemented to execute on a device or data processing system, comprises substantial advancement of the functionality of that device or data processing system in providing centralized key management supporting traffic encryption in a cloud environment.

The illustrative embodiments are described with respect to certain types of hosts, virtual machines, NICs, virtual functions, controllers, protocols, packets, packet formats, encryptions, decryptions, encryption keys, encryption key managements, network activities, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
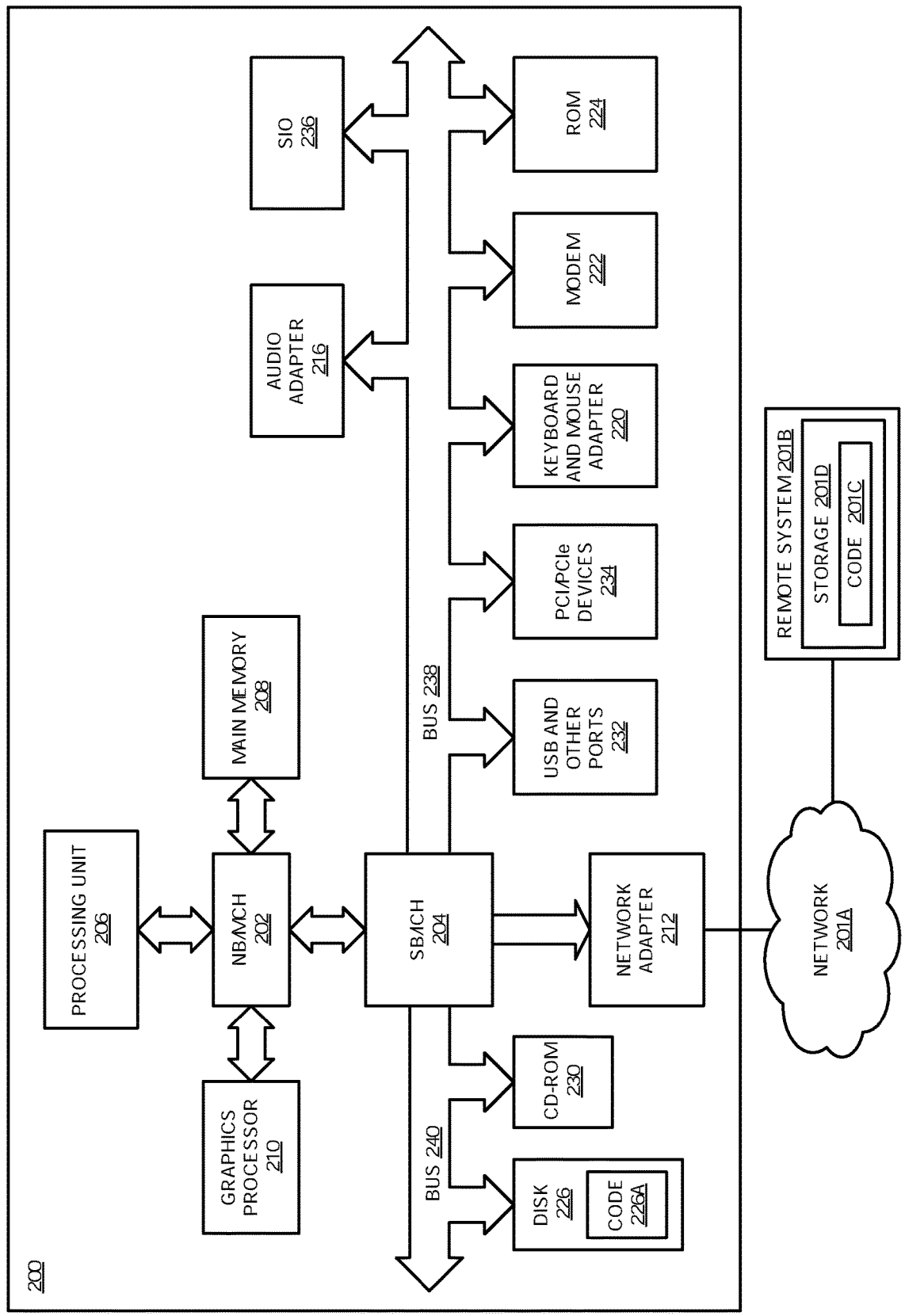
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Controller 132 is an example of a controller described herein. For example, controller 132 can take the form of a network controller, IPSec key controller, compute controller, and others. Alternatively, controller 132 can also take the form of a general-purpose controller implementing various functionalities, including controlling compute resources and networking resources, key management, and others. Any software application described as executing in another data processing system in FIG. 1 can be configured to execute in controller 132 in a similar manner. Any data or information stored or produced in another data processing system in FIG. 1 can be configured to be stored or produced in controller 132 in a similar manner.

Application 105 implements an embodiment described herein. Application 105 runs in controller 132, or in any other suitable location on network 102. Servers 104 and 106 may be configured as hosts on network 102. When servers 104 and 106 are configured as hosts, virtual machines and NIC implementations supporting virtual functions run on servers 104 and 106.

Servers 104 and 106, storage unit 108, and clients 110, 112, and 114, and controller 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as controller 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
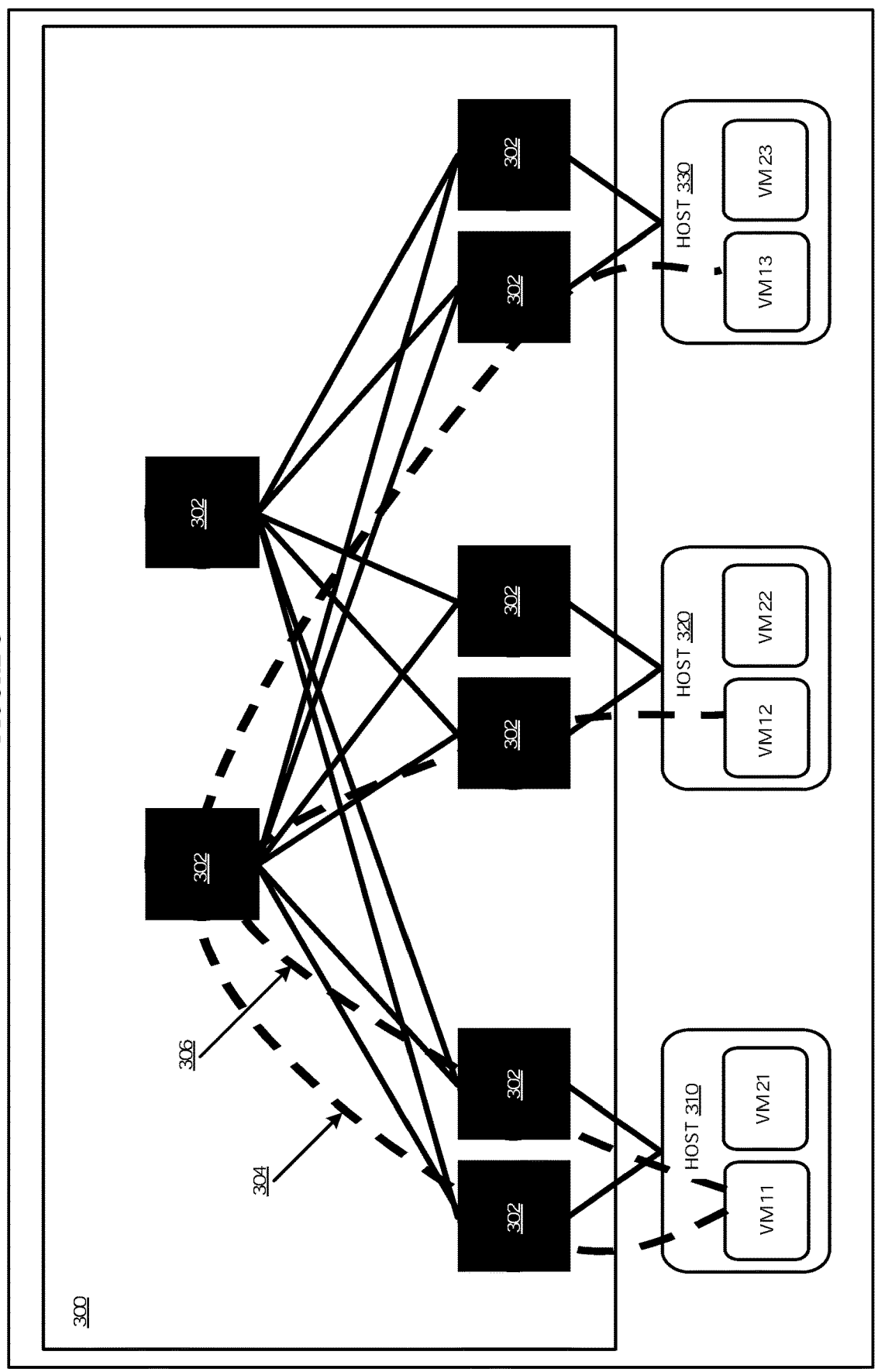
FIG. 3 depicts an example network configuration for point-to-point IPSec implementation in a cloud computing environment, in accordance with prior art.

With reference to FIG. 3, this figure depicts an example network configuration for point-to-point IPSec implementation in a cloud computing environment, in accordance with prior art. Network 300 is an example of network 102 in FIG. 1, and hosts 310, 320, and 330 are examples of server 104 in FIG. 1.

Network 300 includes hosts 310, 320, and 330, connected via network nodes 302. Each of hosts 310, 320, and 330 are examples of server 104 and server 106 in FIG. 1. Host 310 includes VM 11, belonging to tenant 1, and VM 21, belonging to tenant 2. Host 320 includes VM 12, belonging to tenant 1, and VM 22, belonging to tenant 2. Host 330 includes VM 13, belonging to tenant 1, and VM 23, belonging to tenant 2. Tunnel 304 provides an encrypted connection between VM 11 running on host 310 and VM 13 running on host 330. Tunnel 306 provides an encrypted connection between VM 11 running on host 310 and VM 12 running on host 320. Traditional IPSec can only be deployed point-to-point to connect one VM to another VM. In addition, even though VM 11, VM 12, and VM 13 are all associated with the same tenant, tunnels 304 and 306 each require their own encryption key. Network 300 includes only a tiny fraction of the infrastructure of a typical computing environment. Thus, as cloud computing infrastructures of hundreds to millions of VMs become more common, both the number of tunnels and the encryption keys required for communication through the tunnels grow exponentially. In addition, performing the necessary traffic encryption and decryption on each VM is computationally demanding, limiting VM performance or requiring additional computing resources. As a result, IPSec is not an effective solution for encrypted networking traffic in a cloud environment at larger scales.

Figure 4:
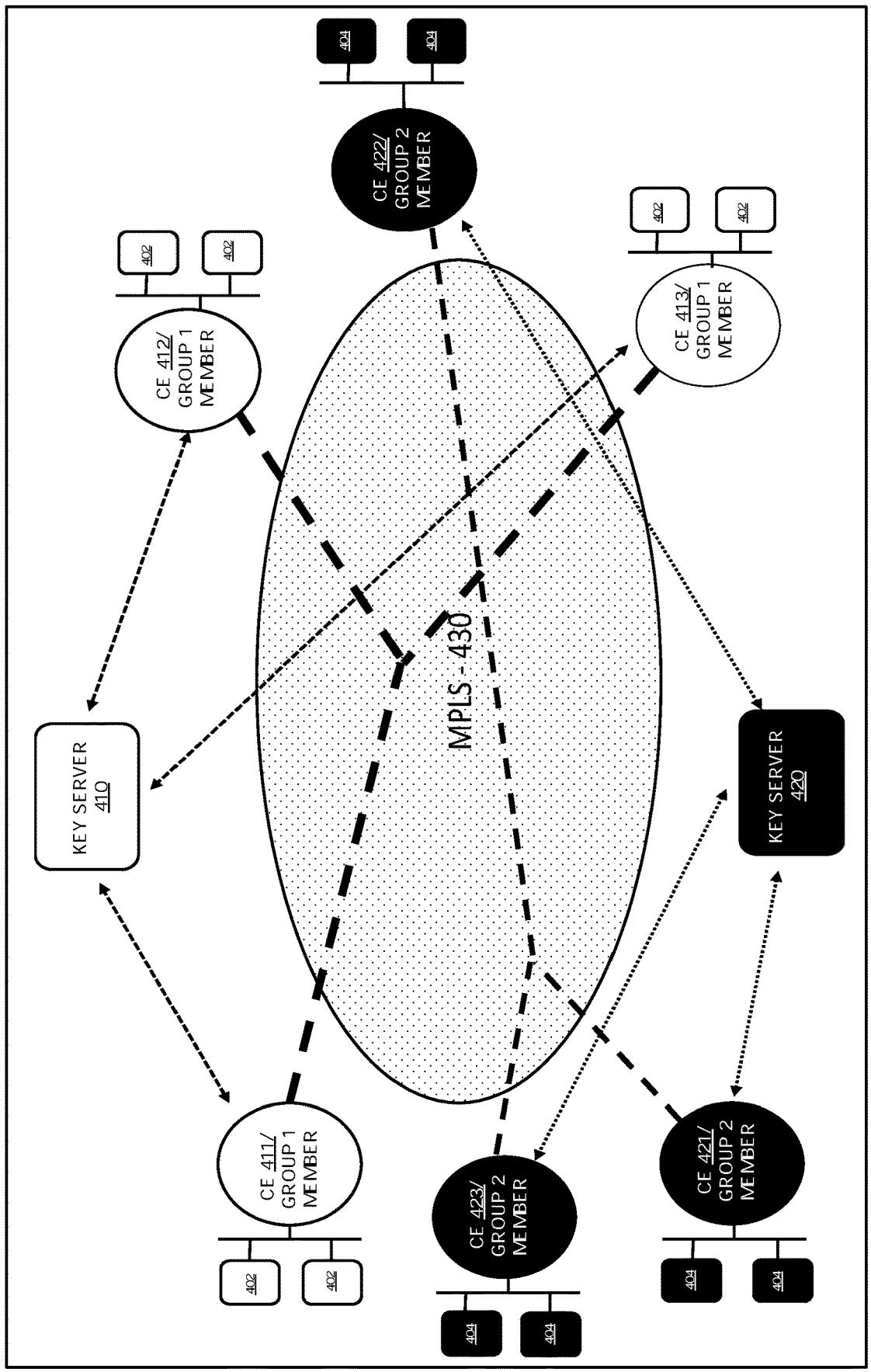
FIG. 4 depicts an example network configuration for VPN implementation over a network configured for an MPLS implementation, in accordance with prior art.

With reference to FIG. 4, this figure depicts an example network configuration for VPN implementation over a network configured for an MPLS implementation, in accordance with prior art. MPLS network 430 is an example of network 102 in FIG. 1, and hosts 402 and 404 are examples of server 104 in FIG. 1.

FIG. 4 includes key server 410 and key server 420. Key server 410 serves customer equipment (CE) 411, CE 412, and CE 413; all are part of tenant group 1 associated with tenant 1. Key server 420 serves CE 421, CE 422, and CE 423; all are part of tenant group 2 associated with tenant 2. Each CE allows one or more of hosts 402 and 404 to connect to MPLS network 430.

CE 411, CE 412, and CE 413 are each group 1 members, maintaining a secured session with key server 410 to receive new encryption keys. Traffic between CE 411, CE 412, and CE 413 is encrypted using the same key, simplifying key management significantly. Similarly, CE 421, CE 422, and CE 423 are each group 2 members, maintaining a secured session with key server 420 to receive new encryption keys. Traffic between CE 421, CE 422, and CE 423 is encrypted using the same key. However, GETVPN and Group VPN implementations, as depicted in FIG. 4, were designed for MPLS networks, and are unsuited for a cloud computing environment for the reasons discussed herein.

Figure 5:
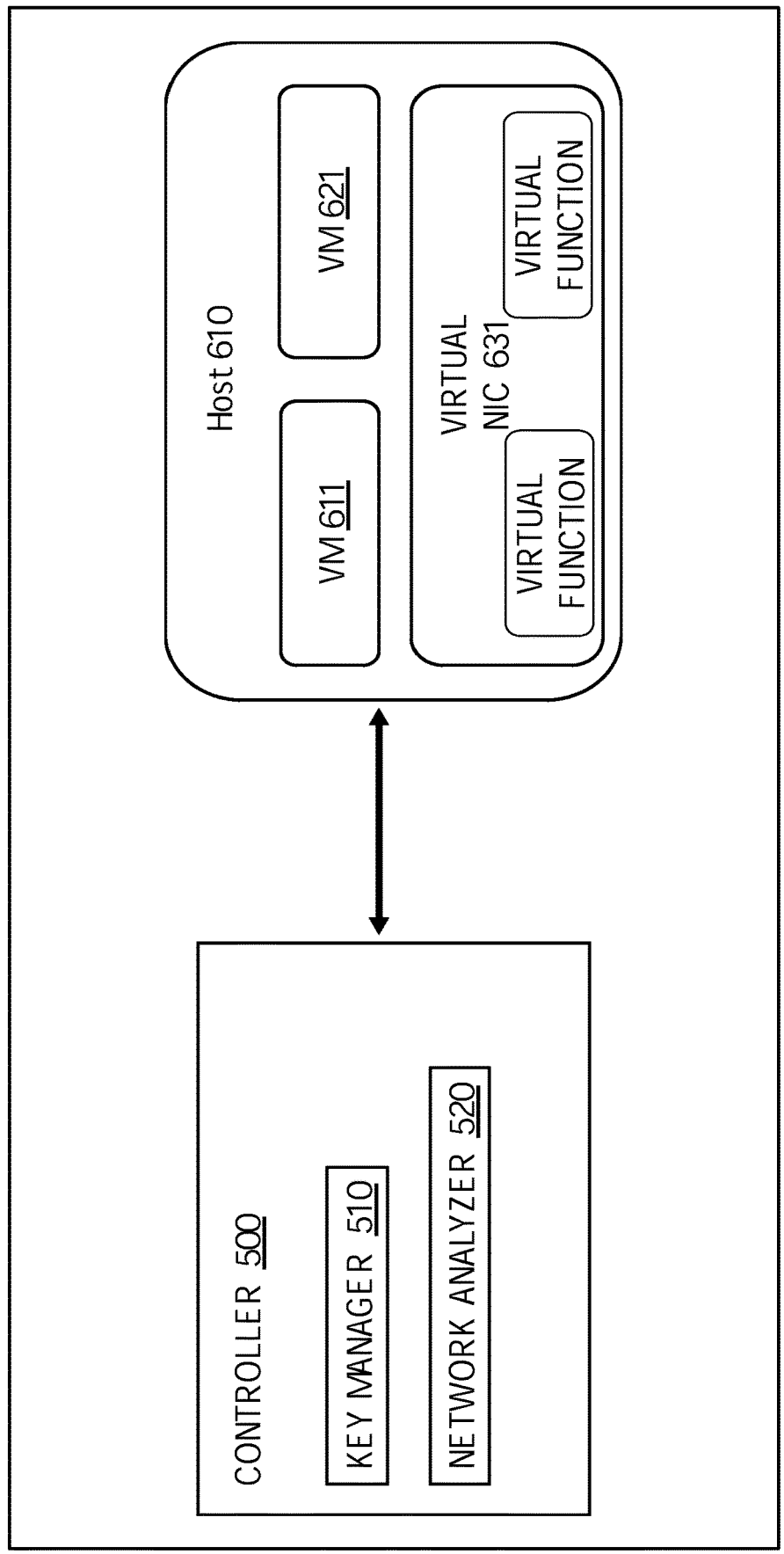
FIG. 5 depicts a block diagram of an example configuration for secure communications among tenant virtual machines in a cloud networking environment in accordance with an illustrative embodiment.

With reference to FIG. 5, this figure depicts a block diagram of an example configuration for secure communications among tenant virtual machines in a cloud networking environment in accordance with an illustrative embodiment. Controller 500 is an example of controller 132 in FIG. 1. Host 610 is an example of server 104 in FIG. 1.

Controller 500 is implemented as an appliance, a cluster of nodes, a VM, a host, a container, or a multiple of these elements. Controller 500 includes key manager 510 and network monitor 520. Key manager 510 provides centralized key management, including key updating, expiration, and revocation.

When a new tenant VM—for example, VM 611 running on host 610—is created, key manager 510 sends the current key for that tenant, including a key ID and a key value, to virtual NIC 631 running on host 610. Virtual NIC 631 binds the current key to a VF, and enables IPSec on the VF. Thus VM 611 sends packets normally. Virtual NIC 631 receives each packet from VM 611, encrypts the packet using the current tenant-specific key, then sends the packet over the network. At the packet's destination, a different host, a second VF running on the host receives the encrypted packet, decrypts it using the same current tenant-specific key, and passes the packet along to an associated VM also running on the host. As a result, traffic between a tenant's VMs is encrypted during transit. VM 621 also runs on host 610 and communicates similarly using virtual NIC 631. Thus key manager 510 need only use one key to encrypt all traffic among VMs of one tenant. In addition, virtual NIC 631 performs encryption and decryption. Encryption and decryption is computationally intensive, and offloading this function from VM 611 and VM 621 improves VM performance.

Key manager 510 also manages key expiration and replacement. Keys are typically replaced every few hours, to maintain security. When an existing key is about to expire, key manager 510 sends out a new key to all hosts—for example, host 610—having tenants using that key, to be applied to corresponding VFs. Key manager 510 can be configured to specify a wait-time window for the new key, to allow enough time for all the VFs to synchronize. As a result, all VFs associated with a tenant update to the new key in a synchronized manner.

Key manager 510 also manages key revocation. Network analyzer 520 monitors and analyzes network activity. If a particular VM—for example, VM 621—appears to be exhibiting suspicious behavior, key manager 510 can quarantine VM 621. A quarantine can be accomplished by revoking the key VM 621 is using, or by updating the keys all the other VMs are using. Using either method, even if the quarantined VM sends encrypted traffic, the other VMs—such as VM 611—will not decrypt the traffic and be affected by the problem.

Figure 6:
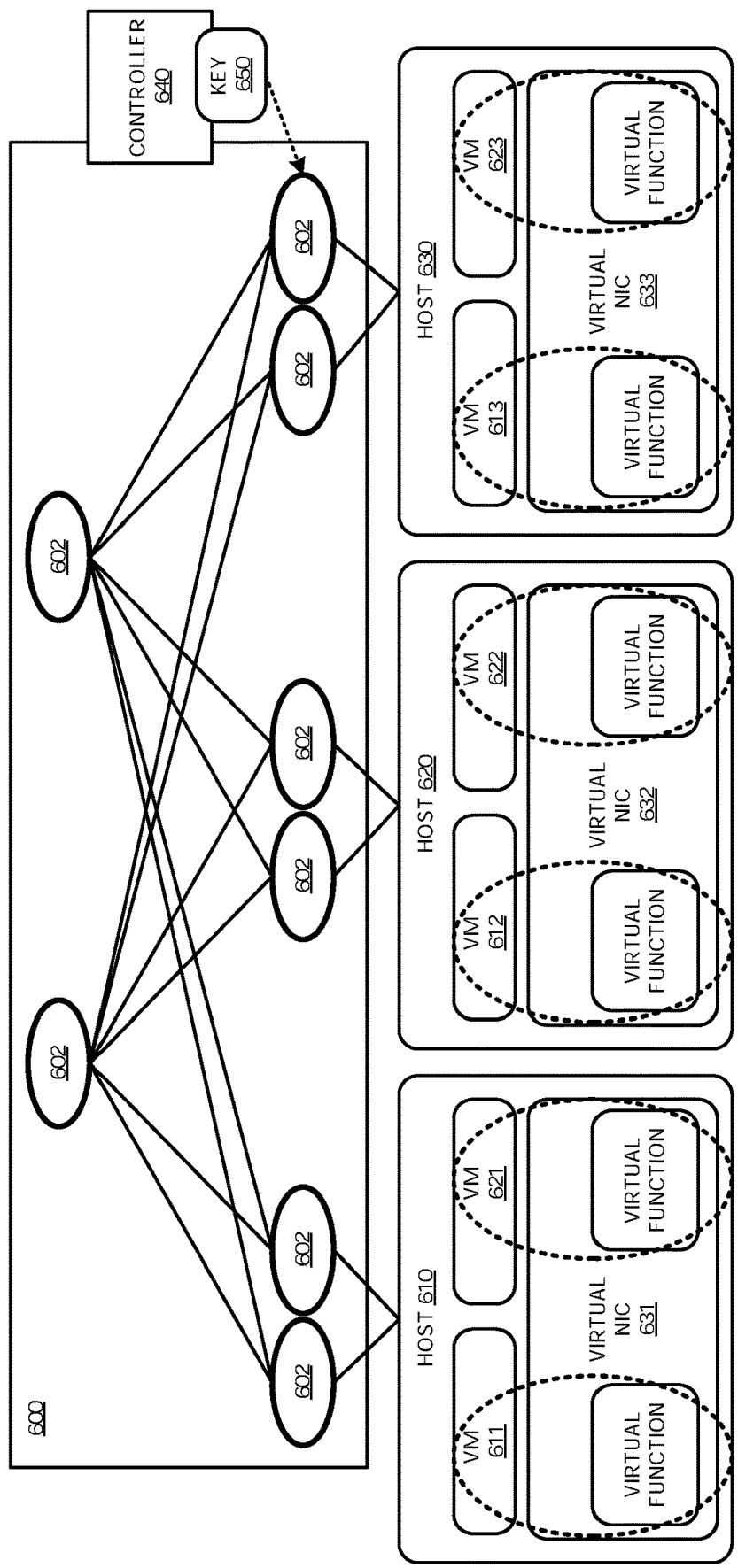
FIG. 6 depicts an example network configuration for secure communications among tenant virtual machines in a cloud networking environment, in accordance with an illustrative embodiment.

With reference to FIG. 6, this figure depicts an example network configuration for secure communications among tenant virtual machines in a cloud networking environment, in accordance with an illustrative embodiment. Network 600 is an example of network 102 in FIG. 1.

Network 600 includes hosts 610, 620, and 630, connected via network nodes 602. Each of hosts 610, 620, and 630 are examples of server 104 and server 106 in FIG. 1. Host 610 includes VM 611, belonging to tenant 1, and VM 621, belonging to tenant 2. Host 620 includes VM 612, belonging to tenant 1, and VM 622, belonging to tenant 2. Host 630 includes VM 613, belonging to tenant 1, and VM 623, belonging to tenant 2. Host 610 also includes virtual NIC 631, having virtual functions associated with VM 611 and VM 621. Host 620 also includes virtual NIC 632, having virtual functions associated with VM 612 and VM 622. Host 630 also includes virtual NIC 633, having virtual functions associated with VM 613 and VM 623. In addition, controller 640 (which is the same as controller 500 in FIG. 5) distributes key 650 to network nodes 602 for distribution to any of virtual NICs 631, 632, and 633. As discussed, key 650 may be a new or updated key. In addition, controller 640 may revoke key 650, or perform other operations relating to key 650.

Controller 640 causes the configuration of traffic packets to provide accessible, unencrypted, packet flow information that can be used to support ECMP functionality for network traffic management. For example, there are many different routes from host 610 to host 620 passing through network nodes 602, and it would be advantageous to spread traffic among all equal-cost paths.

Figure 7:
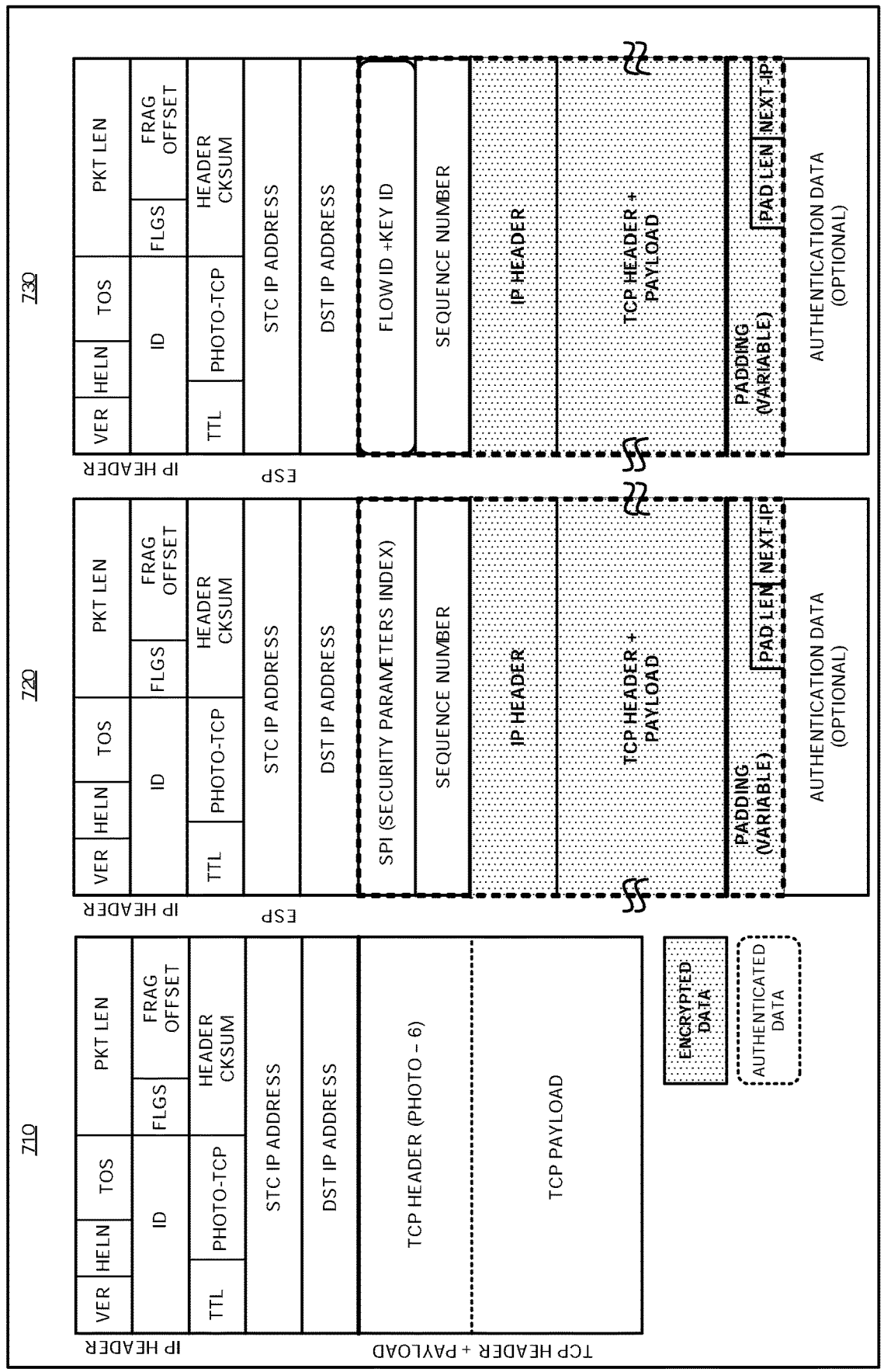
FIG. 7 depicts examples of IPv4 datagrams for use among tenant virtual machines in a cloud networking environment, in accordance with an illustrative embodiment.

FIG. 7 depicts examples of IPv4 datagrams for use among tenant virtual machines in a cloud networking environment, in accordance with an illustrative embodiment. Datagram 710 depicts an original IPv4 packet, prior to any security-related improvements. Datagram 720 depicts a modified IPv4 packet for use in a traditional IPSec implementation. Datagram 720 includes the IP header, TCP header, padding, pad length parameter, and next IP parameters within the encrypted section.

Datagram 730 depicts a modified IPv4 packet for use in an illustrative embodiment, for example network 600 of FIG. 6. Datagram 730 includes the IP header, TCP header, padding, pad length parameter, and next IP parameters within the encrypted section. However, datagram 730 also includes key ID and flow ID information within an authenticated, but unencrypted section of datagram 730. Key ID refers to the identification number of the key used to encrypt the packet. For example, if a tenant is currently using key number 25 to encrypt the tenant's packets, the key ID included in each of that tenant's packets would be 25. Flow ID refers to information generated by the sending VF, based on flow information such as the source IP address, destination IP address, protocol number, source port, and destination port for a particular packet. Using this flow information allows network 600 to route traffic over any of network nodes 602, producing efficient traffic flow.

Figure 8:
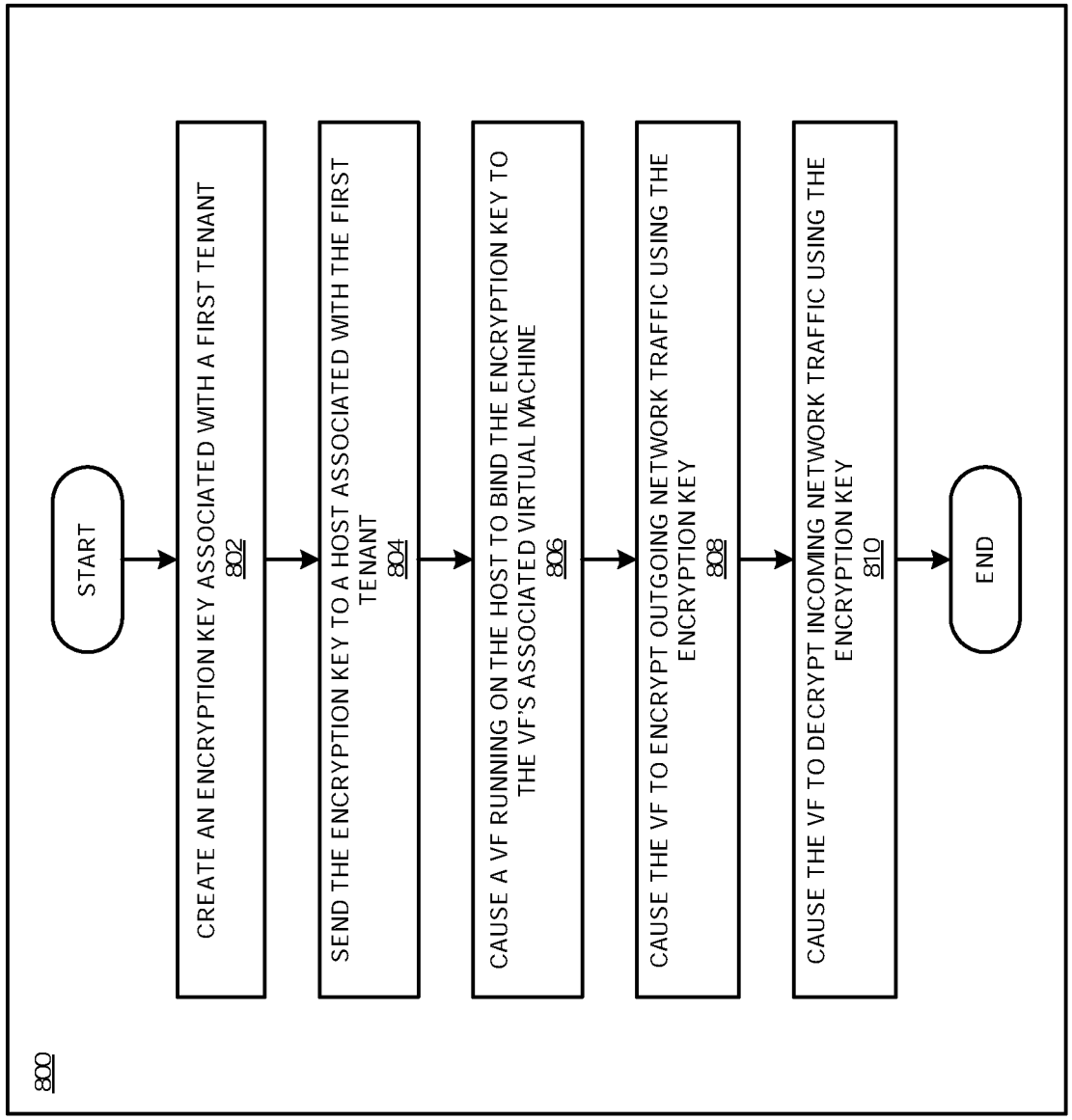
FIG. 8 depicts a flowchart of an example process for secure communications among tenant virtual machines in a cloud networking environment in accordance with an illustrative embodiment.

With reference to FIG. 8, this figure depicts a flowchart of an example process for secure communications among tenant virtual machines in a cloud networking environment in accordance with an illustrative embodiment. Process 800 can be implemented in application 105 in FIG. 1.

In block 802, the application creates an encryption key associated with a first tenant. In block 804, the application sends the encryption key to a host associated with the first tenant. In block 806, the application causes a VF running on the host to bind the encryption key to the VF's associated virtual machine. In block 808, the application causes the VF to encrypt outgoing network traffic using the encryption key. In block 810, the application causes the VF to decrypt incoming network traffic using the encryption key. Then the application ends.

Figure 9:
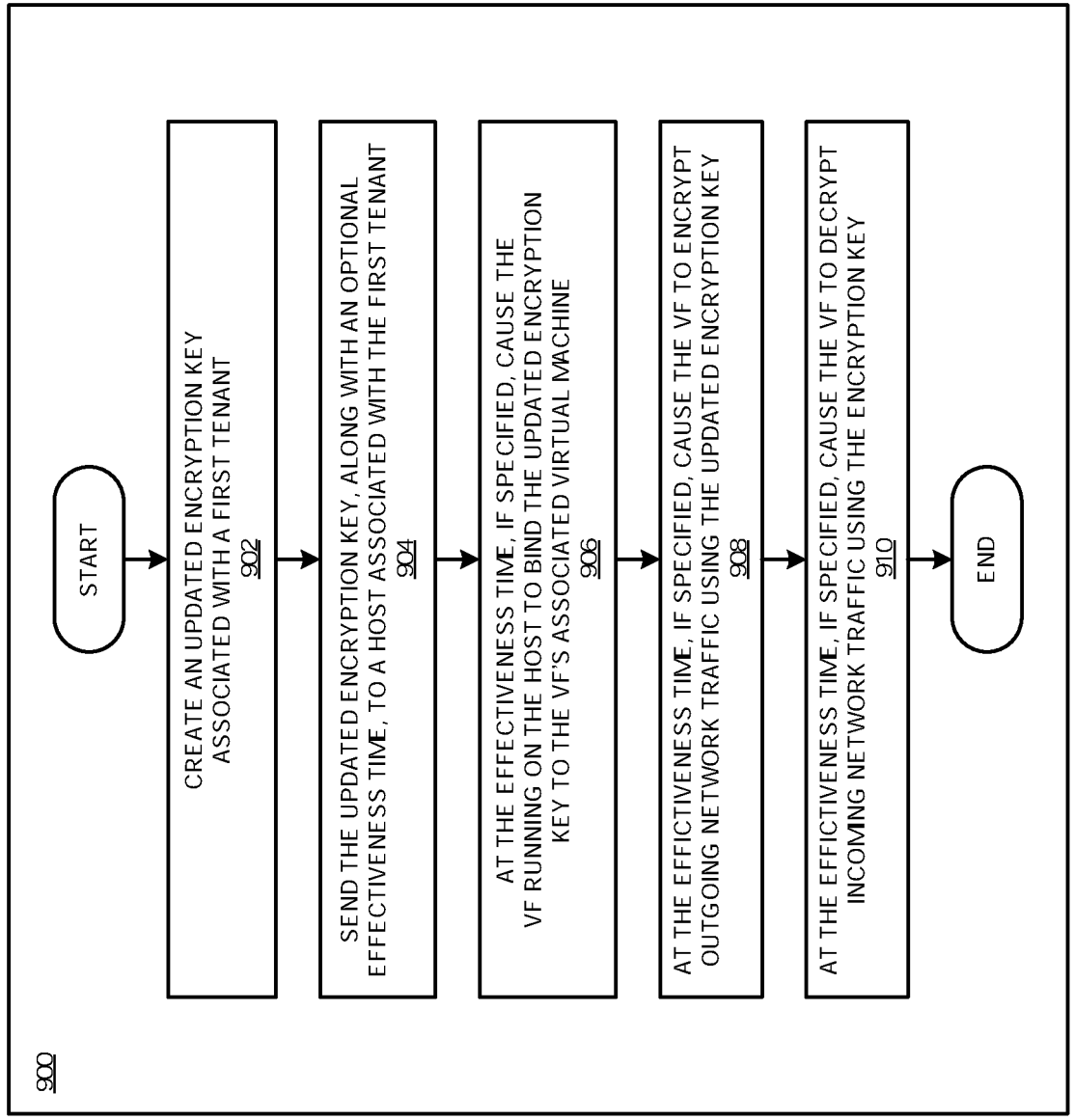
FIG. 9 depicts a flowchart of an example process for secure communications among tenant virtual machines in a cloud networking environment in accordance with an illustrative embodiment.

With reference to FIG. 9, this figure depicts a flowchart of an example process for secure communications among tenant virtual machines in a cloud networking environment in accordance with an illustrative embodiment. Process 900 can be implemented in application 105 in FIG. 1.

In block 902, the application creates an updated encryption key associated with a first tenant. In block 904, the application sends the updated encryption key, along with an optional effectiveness time, to a host associated with the first tenant. In block 906, at the effectiveness time, if one was specified, the application causes a VF running on the host to bind the encryption key to the VF's associated virtual machine. In block 908, at the effectiveness time, if one was specified, the application causes the VF to encrypt outgoing network traffic using the encryption key. In block 910, at the effectiveness time, if specified, the application causes the VF to decrypt incoming network traffic using the encryption key. Then the application ends.

Thus, a computer implemented method, system or apparatus, and computer program product are provided in the illustrative embodiments for secure communications among tenant virtual machines in a cloud networking environment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

creating a first encryption key associated with a first tenant;

configuring the first encryption key in a host where a virtual machine associated with the first tenant is executing, the host including a network interface controller configured to have a virtual network interface function, the virtual network interface function executing on the host and being associated with the virtual machine of the first tenant;

causing the virtual network interface function to bind the first encryption key to the virtual machine of the first tenant;

causing the virtual network interface function to encrypt outgoing network traffic of the first tenant using the first encryption key;

causing the virtual network interface function to decrypt incoming network traffic for the first tenant using the first encryption key;

creating a second encryption key associated with the first tenant;

sending, to the host, the second encryption key;

causing the virtual network interface function to unbind the first encryption key to the virtual machine and bind the second encryption key to the virtual machine;

causing the virtual network interface function to encrypt outgoing network traffic of the first tenant using the second encryption key; and causing the virtual network interface function to decrypt incoming network traffic for the first tenant using the second encryption key.

2. The method of claim 1, further comprising:

creating a third encryption key associated with the first tenant;

sending, to the host, the third encryption key;

sending, to the host, an effectiveness time associated with the third encryption key;

causing, at the effectiveness time, the virtual network interface function to unbind the first encryption key to the virtual machine and bind the second encryption key to the virtual machine;

causing, at the effectiveness time, the virtual network interface function to encrypt outgoing network traffic of the first tenant using the second encryption key; and causing, at the effectiveness time, the virtual network interface function to decrypt incoming network traffic for the first tenant using the second encryption key.

3. The method of claim 1, further comprising:

sending, to the host, a message revoking the first encryption key, the revoking message rendering the first encryption key invalid for encrypting and decrypting network traffic.

4. The method of claim 1, further comprising:

identifying, using network activity analysis, a second virtual machine requiring a quarantine, the second virtual machine executing on the host and associated with the first tenant;

creating a fourth encryption key associated with the first tenant;

sending, to the host, the fourth encryption key;

causing the virtual network interface function to unbind the first encryption key to the virtual machine and bind the fourth encryption key to the virtual machine, causing the virtual network interface function to encrypt outgoing network traffic of the first tenant using the fourth encryption key;

causing the virtual network interface function to decrypt incoming network traffic for the first tenant using the fourth encryption key;

causing a second virtual network interface function executing on the host and associated with the second virtual machine to encrypt outgoing network traffic of the first tenant using the first encryption key; and causing the second virtual network interface function to decrypt incoming network traffic for the first tenant using the first encryption key.

5. The method of claim 1, wherein network traffic comprises an encrypted portion encrypted using the first encryption key, an unencrypted packet identification portion, and an unencrypted flow identification portion.

6. The method of claim 1, wherein the first encryption key is created according to a policy of the first tenant.

7. A computer usable program product comprising one or more computer-readable storage devices, and program instructions stored on at least one of the one or more storage devices, the stored program instructions comprising:

program instructions to create a first encryption key associated with a first tenant;

program instructions to configure the first encryption key in a host where a virtual machine associated with the first tenant is executing, the host including a network interface controller configured to have a virtual network interface function, the virtual network interface function executing on the host and being associated with the virtual machine of the first tenant;

program instructions to cause the virtual network interface function to bind the first encryption key to the virtual machine;

program instructions to cause the virtual network interface function to encrypt outgoing network traffic of the first tenant using the first encryption key;

program instructions to cause the virtual network interface function to decrypt incoming network traffic for the first tenant using the first encryption key;

program instructions to create a second encryption key associated with the first tenant;

program instructions to send, to the host, the second encryption key;

program instructions to cause the virtual network interface function to unbind the first encryption key to the virtual machine and bind the second encryption key to the virtual machine;

program instructions to cause the virtual network interface function to encrypt outgoing network traffic of the first tenant using the second encryption key; and program instructions to cause the virtual network interface function to decrypt incoming network traffic for the first tenant using the second encryption key.

8. The computer usable program product of claim 7, further comprising:

program instructions to create a third encryption key associated with the first tenant;

program instructions to send, to the host, the third encryption key;

program instructions to send, to the host, an effectiveness time associated with the third encryption key;

program instructions to cause, at the effectiveness time, the virtual network interface function to unbind the first encryption key to the virtual machine and bind the second encryption key to the virtual machine;

program instructions to cause, at the effectiveness time, the virtual network interface function to encrypt outgoing network traffic of the first tenant using the second encryption key; and program instructions to cause, at the effectiveness time, the virtual network interface function to decrypt incoming network traffic for the first tenant using the second encryption key.

9. The computer usable program product of claim 7, further comprising:

program instructions to send, to the host, a message revoking the first encryption key, the revoking message rendering the first encryption key invalid for encrypting and decrypting network traffic.

10. The computer usable program product of claim 7, further comprising:

program instructions to identifying, using network activity analysis, a second virtual machine requiring a quarantine, the second virtual machine executing on the host and associated with the first tenant;

program instructions to create a fourth encryption key associated with the first tenant;

program instructions to send, to the host, the fourth encryption key;

program instructions to cause the virtual network interface function to unbind the first encryption key to the virtual machine and bind the fourth encryption key to the virtual machine, program instructions to cause the virtual network interface function to encrypt outgoing network traffic of the first tenant using the fourth encryption key;

program instructions to cause the virtual network interface function to decrypt incoming network traffic for the first tenant using the fourth encryption key;

program instructions to cause a second virtual network interface function executing on the host and associated with the second virtual machine to encrypt outgoing network traffic of the first tenant using the first encryption key; and program instructions to cause the second virtual network interface function to decrypt incoming network traffic for the first tenant using the first encryption key.

11. The computer usable program product of claim 7, wherein network traffic comprises an encrypted portion encrypted using the first encryption key, an unencrypted packet identification portion, and an unencrypted flow identification portion.

12. The computer usable program product of claim 7, wherein the first encryption key is created according to a policy of the first tenant.

13. The computer usable program product of claim 7, wherein the computer usable code is stored in a computer readable storage device in a data processing system, and wherein the computer usable code is transferred over a network from a remote data processing system.

14. The computer usable program product of claim 7, wherein the computer usable code is stored in a computer readable storage device in a server data processing system, and wherein the computer usable code is downloaded over a network to a remote data processing system for use in a computer readable storage device associated with the remote data processing system.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to create a first encryption key associated with a first tenant;

program instructions to configure the first encryption key in a host where a virtual machine associated with the first tenant is executing, the host including a network interface controller configured to have a virtual network interface function, the virtual network interface function executing on the host and being associated with the virtual machine of the first tenant;

program instructions to cause the virtual network interface function to bind the first encryption key to the virtual machine;

program instructions to cause the virtual network interface function to encrypt outgoing network traffic of the first tenant using the first encryption key;

program instructions to cause the virtual network interface function to decrypt incoming network traffic for the first tenant using the first encryption key;

program instructions to create a second encryption key associated with the first tenant;

program instructions to send, to the host, the second encryption key;

program instructions to cause the virtual network interface function to unbind the first encryption key to the virtual machine and bind the second encryption key to the virtual machine;

program instructions to cause the virtual network interface function to encrypt outgoing network traffic of the first tenant using the second encryption key; and program instructions to cause the virtual network interface function to decrypt incoming network traffic for the first tenant using the second encryption key.

16. The system of claim 15, further comprising:

program instructions to create a third encryption key associated with the first tenant;

program instructions to send, to the host, the third encryption key;

program instructions to send, to the host, an effectiveness time associated with the third encryption key;

program instructions to cause, at the effectiveness time, the virtual network interface function to unbind the first encryption key to the virtual machine and bind the second encryption key to the virtual machine;

program instructions to cause, at the effectiveness time, the virtual network interface function to encrypt outgoing network traffic of the first tenant using the second encryption key; and program instructions to cause, at the effectiveness time, the virtual network interface function to decrypt incoming network traffic for the first tenant using the second encryption key.

17. The system of claim 15, further comprising:

program instructions to send, to the host, a message revoking the first encryption key, the revoking message rendering the first encryption key invalid for encrypting and decrypting network traffic.

* * * * *